June 30, 1964 H. A. FROMM ETAL 3,139,126
FRUIT JUICE EXTRACTOR HAVING INTERMITTENT
CUP ASSEMBLY ELEVATING MEANS
Original Filed Oct. 18, 1955 8 Sheets-Sheet 1

INVENTORS
HERBERT A. FROMM,
JOHN A. FROMM,

Wynne & Finken
ATTORNEYS

June 30, 1964 H. A. FROMM ETAL 3,139,126
FRUIT JUICE EXTRACTOR HAVING INTERMITTENT
CUP ASSEMBLY ELEVATING MEANS
Original Filed Oct. 18, 1955 8 Sheets-Sheet 2

INVENTORS
HERBERT A. FROMM,
JOHN A. FROMM,
BY Wynne & Finken
ATTORNEYS

INVENTORS
HERBERT A. FROMM,
JOHN A. FROMM,
BY Wynne & Finken
ATTORNEYS

June 30, 1964  H. A. FROMM ETAL  3,139,126
FRUIT JUICE EXTRACTOR HAVING INTERMITTENT
CUP ASSEMBLY ELEVATING MEANS
Original Filed Oct. 18, 1955  8 Sheets-Sheet 6

INVENTORS
HERBERT A. FROMM,
JOHN A. FROMM,

BY Wynne & Finken

ATTORNEYS

June 30, 1964

H. A. FROMM ETAL 3,139,126

FRUIT JUICE EXTRACTOR HAVING INTERMITTENT
CUP ASSEMBLY ELEVATING MEANS

Original Filed Oct. 18, 1955

INVENTORS
HERBERT A. FROMM,
JOHN A. FROMM,

BY Wynne & Finken

ATTORNEYS

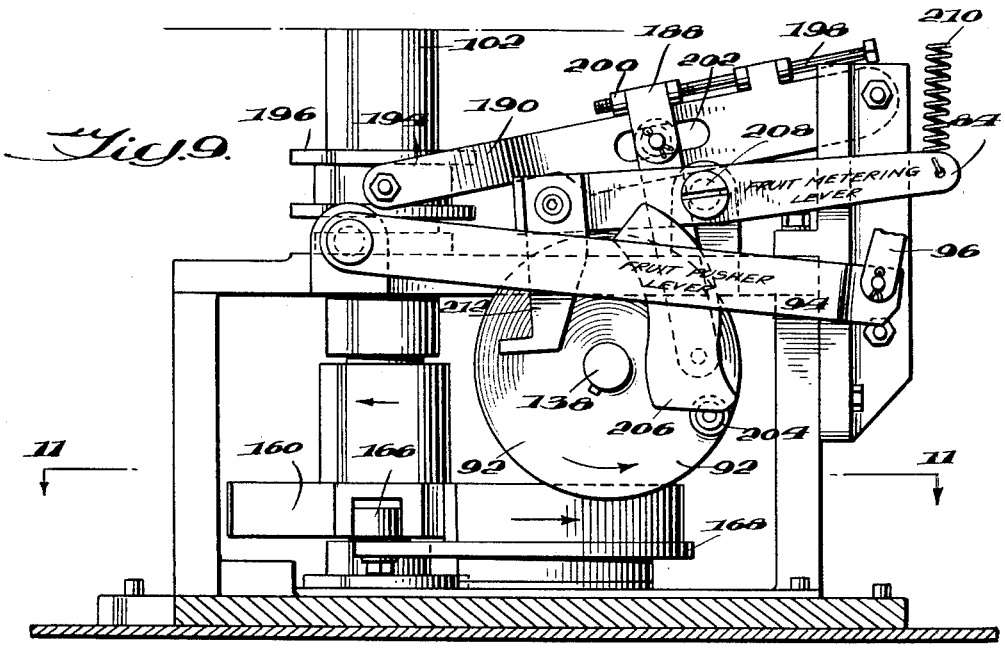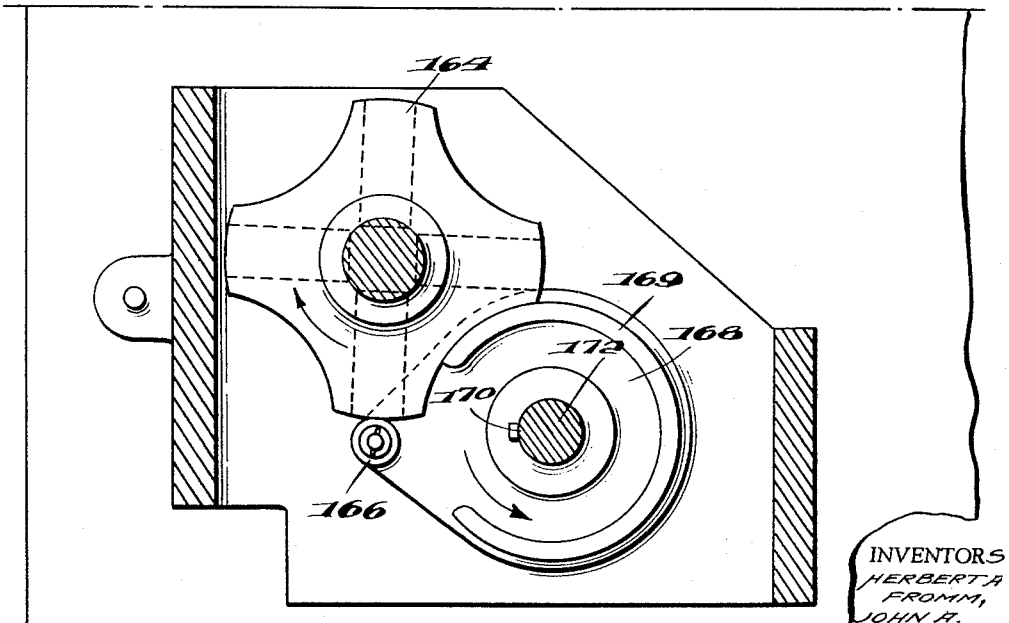

United States Patent Office 3,139,126
Patented June 30, 1964

3,139,126
FRUIT JUICE EXTRACTOR HAVING INTERMITTENT CUP ASSEMBLY ELEVATING MEANS
Herbert A. Fromm and John A. Fromm, Hamburg, Wis., assignors to Fromm Bros. Inc., Hamburg, Wis., a corporation of Wisconsin
Original application Oct. 18, 1955, Ser. No. 541,158, now Patent No. 2,937,678, dated May 24, 1960. Divided and this application Jan. 11, 1960, Ser. No. 1,748
15 Claims. (Cl. 146—3)

This is a divisional application of our application Serial Number 541,158, filed October 18, 1955, now Patent No. 2,937,678.

This invention relates to a machine for extracting juice from oranges and other like fruit, and more particularly, the invention is directed to a machine which processes the fruit from start to finish completely automatically.

The inventor and others have, in the past, constructed machines of this general type, but none has been completely satisfactory to meet the requirements of economy, reliability, speed and efficiency.

It is the principal object of the invention to provide a machine which is mechanically very rugged and capable of handling a large output.

It is another object of the invention to provide a machine having as its central feature a rotating and vertically moving table which moves fruit halves through four stages of operation; namely, cutting, positioning, reaming and ejecting.

It is another object of the invention to provide an improved metering arrangement including a clamshell dam which meters a gravity feed of the whole fruit.

It is another object of the invention to provide an improved cutting mechanism.

It is still another object of the invention to provide in the reaming operation a mechanism for progressively diminishing the speed of movement of the fruit half toward the reamers, thereby permitting the reamers to extract the maximum juice with the minimum pressure and minimum use of power.

It is yet another object of the invention to provide an improved mechanism for conveniently separating juice from pulp.

It is still another object of the invention to provide a new ejecting mechanism, including an ejecting plow which cooperates with the fruit holding cups on a rotating table.

These and other objects will become more readily apparent from the following detailed description of the invention taken in conjunction with the accompanying drawings, in which:

FIGURE 9 is a side elevational view of a part of the cam mechanism;

FIGURE 11 is a sectional view taken along lines 11—11 of FIGURE 9.

Figure 1:
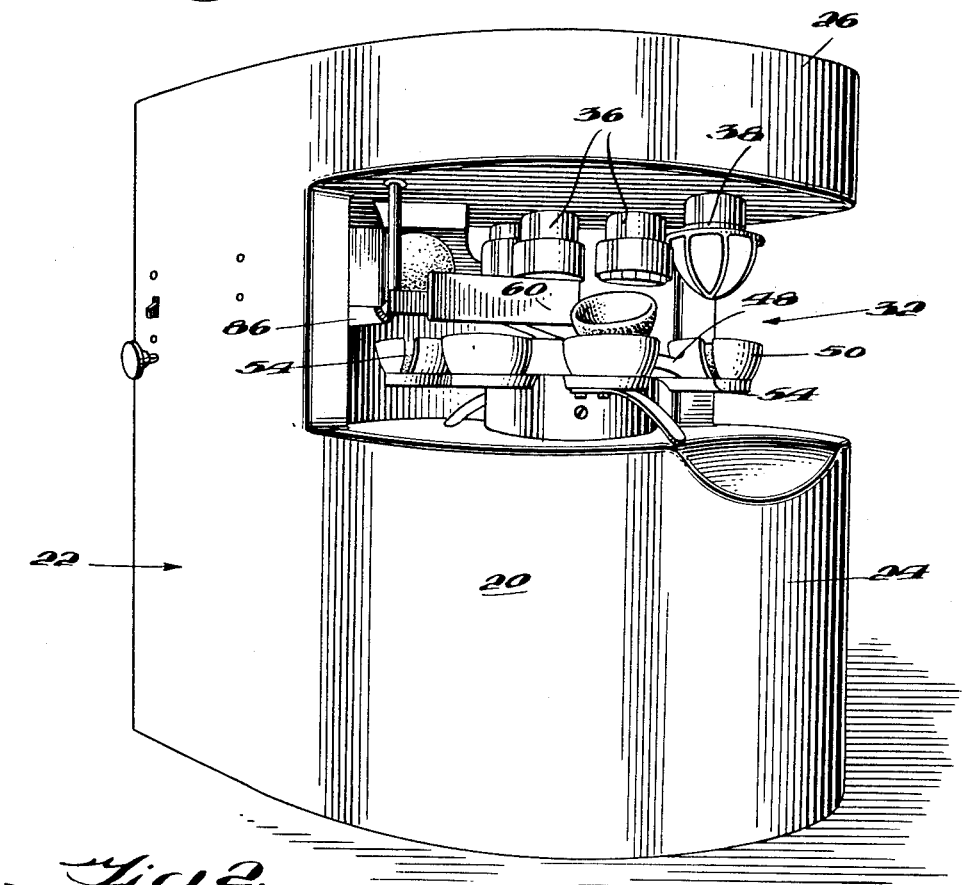
FIGURE 1 is a perspective view of the machine with the front shield and juice bowl removed.

Referring particularly to FIGURES 1–5, the machine 20 is encased in a housing 22, having a lower portion 24 enclosing the gear and cam mechanism, and an upper portion 26 which encloses a hopper 28 and, below the hopper, a belt and pulley arrangement for operating the reamers and rotating a conical central portion 30 of the hopper.

A large cavity 32 is formed in the housing and is normally closed by a semi-cylindrical shield which is not shown. The central cavity houses the principal processing parts, including a cutting knife 34, fruit positioners 36, biased downwardly by springs 37, and a pair of reamers 38.

A juice bowl 40 having a juice spout 42, a rind exit chute 44 and a pulp exit chute 46 is set on the lower portion of the housing 24. Rotatably mounted in the juice bowl is a cup assembly 48, comprising four pairs of cups 50, which receive the fruit halves after they have been cut by the knife 34. Each cup is provided with small sharp knives 52 (FIG. 5) which will pierce the rind of the fruit and hold the fruit firmly in place in the cup during processing.

Each cup is provided with slots 54 which receive an ejector plow 56 comprising two wedge-shaped fingers 58 which pass through the slots. Fixed to the plow 56 is a baffle 60 which brushes off the rinds which are ejected by the plow 58 so that the rinds fall into chute 44.

The parts described above are the principal operating means. Cooperating with these parts are means for metering the fruit one at a time into the operating mechanism, coupled with an arrangement for cutting the fruit; means for rotating the cup assembly 48 intermittently and for an angular distance of 90 degrees with each rotary movement; means for elevating the cup assembly to cause engagement of the fruit with the operating parts; means for driving the reamers 38; and means for separating the fruit juice from the pulp and seeds.

*Mechanism for Separating Juice From Pulp and Seeds*

Figure 3:
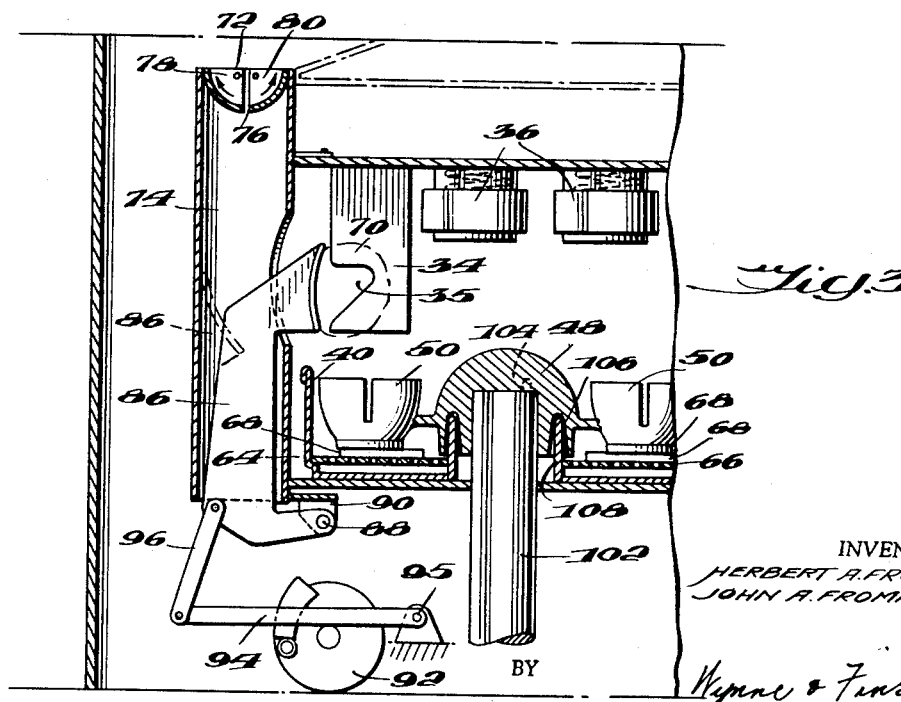
FIGURE 3 is a diagrammatic cross-sectional view taken diagonally through the center of the machine.
Figure 4:
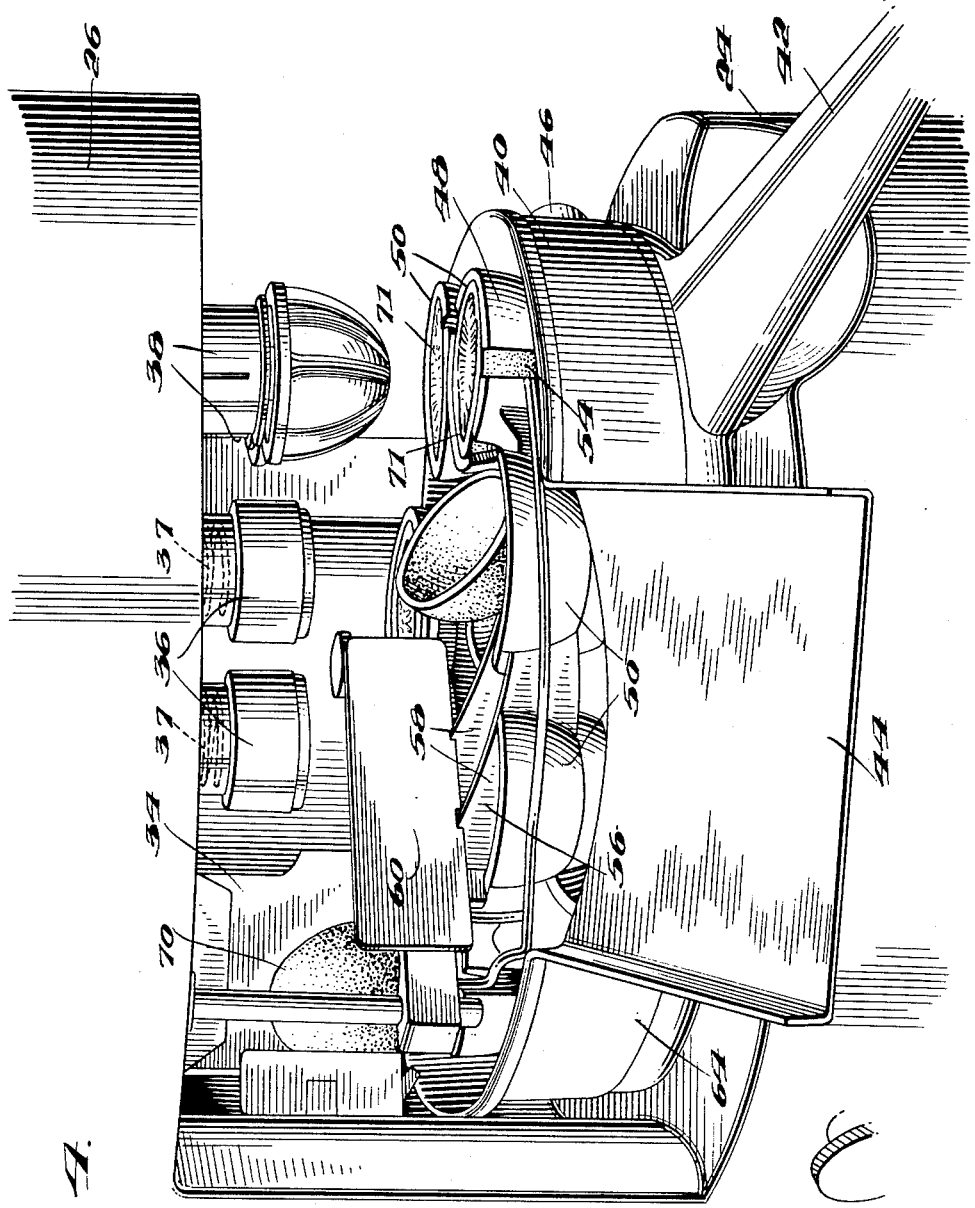
FIGURE 4 is a perspective view of the principal operating parts of the machine.
Figure 5:
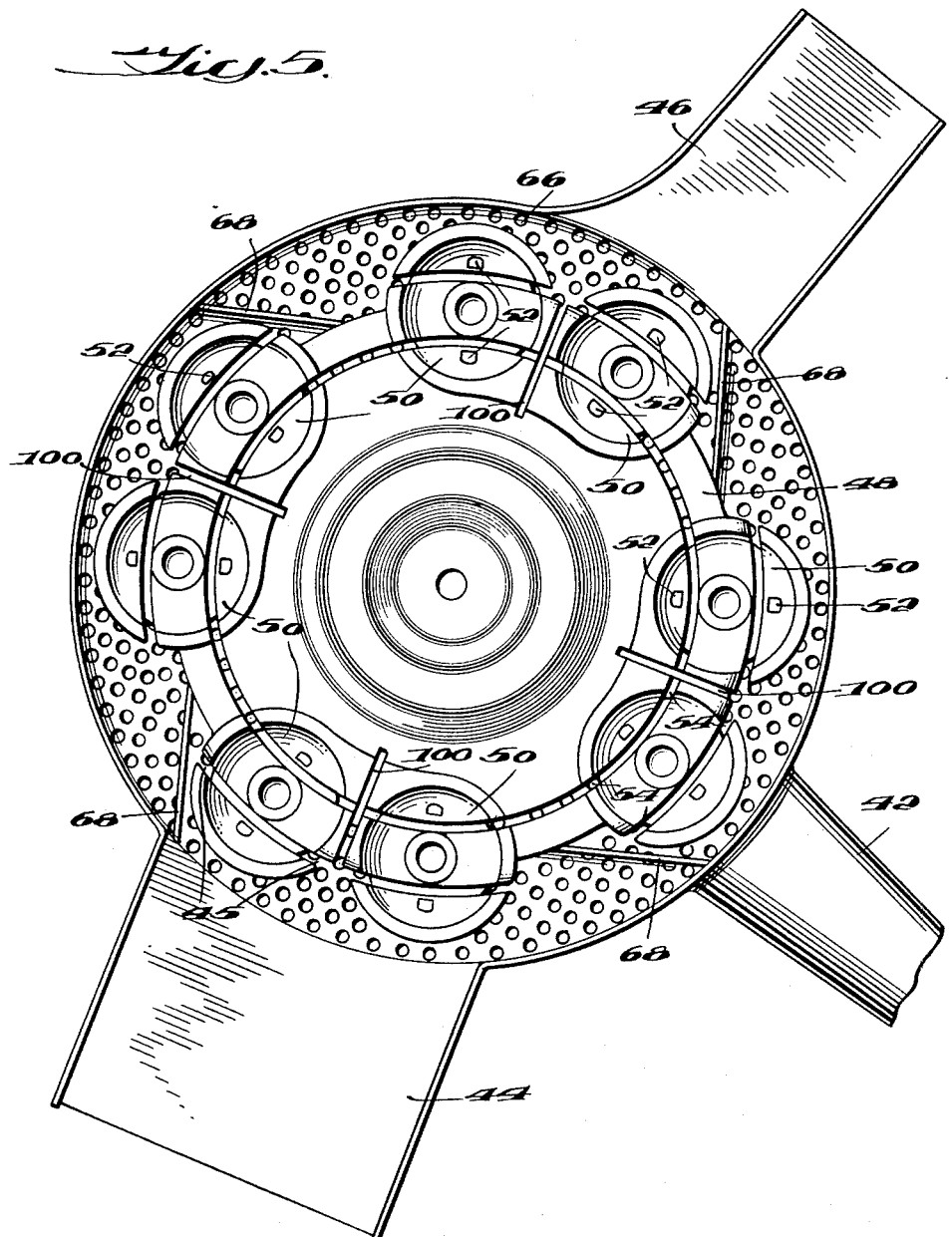
FIGURE 5 is a top plan enlarged view of the cup assembly and juice bowl.

It can be seen, particularly from FIG. 4, that the juice bowl 40 is provided with an annular shoulder 64 positioned below the cups 50 on the cup assembly. The juice spout 42 is positioned below the shoulder, whereas the debris exit chute 46 is positioned above the shoulder. Resting on the annular shoulder is a foraminous screen 66 (FIGS. 3 and 5). Cooperating with the screen are four wiper blades 68. Optionally, the wiper blades can be engaged by a cup assembly for rotation to wipe the pulp off the foraminous screen and out the exit chute 46, or the wiper blades can be fixed with respect to the chute and the foraminous screen can be splined to the shaft which rotates a cup assembly. In the embodiment illustrated, the wiper blades are engaged by the cup assembly.

It also should be noted that the rind exit chute 44 is mounted much higher than the debris exit chute 46, whereas the debris exit chute is mounted at the plane of the upper surface of the foraminous screen. Thus all of the pulp will be swept out the debris exit chute, whereas no pulp will be able to leave by the rind chute.

*Metering and Cutting Mechanism*

Figure 2:
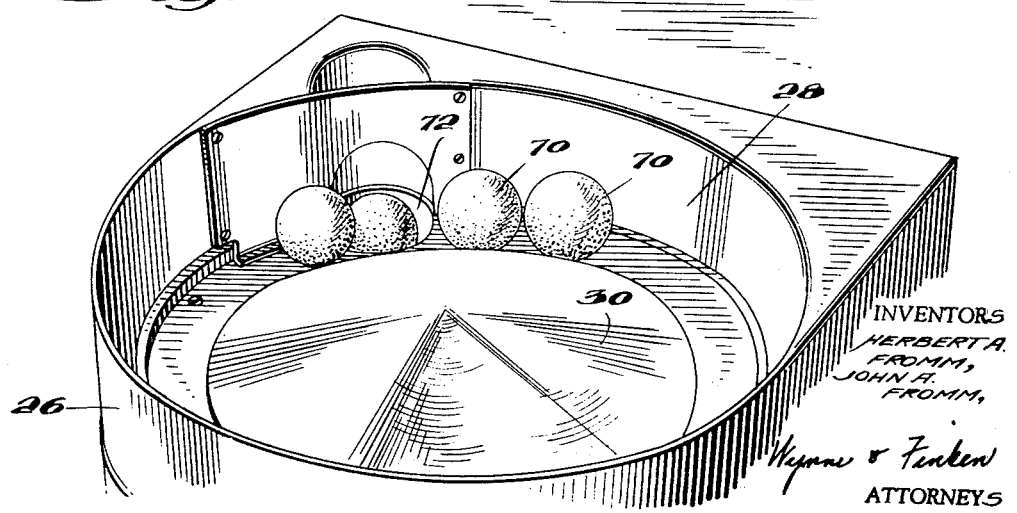
FIGURE 2 is a perspective view of the top portion of the machine.

FIGS. 2 and 3 illustrate the principle of operation of the device which meters one fruit at a time into the machine and cuts the fruit so that the halves will drop into the cups 50 of the cup assembly.

The fruit 70 is disposed in the hopper 28 and is caused to roll around the outside wall of the hopper by the rotating conical floor 30. A hole 72 connects the hopper 28 with a cylindrical passageway 74. At the top of the passageway 74 is a metering device 76, referred to as a clamshell dam. This clamshell dam is essentially two quarter spheres 78 and 80 which are pivotally mounted at their ends to the passageway 74. A linkage 82 (FIG. 6) connected to a cam follower lever 84 causes the quarter spheres 78 and 80 to rotate 90 degrees, permitting one fruit to pass down the passage 74. The manner in which this movement is timed in relation to the movements of the other members will be described with more particularity in connection with FIGS. 9 and 10.

A fruit pusher 86, when in the dotted line position, receives the fruit coming from the clamshell dam 76. The fruit pusher is pivoted at 88 to the frame 90 of the machine. The fruit pusher is operated by a cam 92, operating a cam follower lever 94 pivoted at 95 to the frame. A link 96 connects the lever 94 with the fruit pusher 86. This operating mechanism will also be explained in more detail in connection with FIGS. 9 and 10.

At timed intervals, the fruit pusher 86 is urged to the full line position, during which movement a fruit 70 is pushed onto the knife 34, where it is partially cut in half. A slot 35 in the knife leaves an uncut portion in the fruit which serves to retain the fruit on the knife when the fruit pusher returns to its dotted line position.

After it has been returned to its dotted line position, a mechanism to be described below causes the cup assembly 48 to rise, forcing the fruit to be completely severed by the knife 34. It will be observed from FIG. 5 that the cup assembly is provided with radial slots 100, through which the knife 34 passes when the cup assembly is elevated.

The mounting of the cup assembly to permit the rotary and elevating movements is best shown in FIG. 3. The cup assembly is mounted on a central shaft 102 having a pin 104 at the top thereof, which engages a hole in the cup assembly. The pin and hole act as a key and keyway arrangement to transmit the rotary motion of the shaft 102 to the cup assembly 48.

The bottom surface of the cup assembly, at the hub thereof, has an annular slot 106 which receives an annular flange 108, which is integral with and forms a part of the juice bowl 40. The annular flange 108 is obviously necessary to prevent the fruit juice from running down into the drive mechanism located in the lower portion of the machine. The design of the hub of the cup assembly, including the groove 106, assists in this requirement. At the same time, the groove permits the cup assembly to be rotated and moved up and down with respect to the juice bowl.

When the cutting operation is completed, the halves 71 of the cut fruit drop into the cups on either side of the knife and are ready for further processing.

*Positioning Mechanism*

As a general rule, after the cutting operation the cut faces of the fruit are not level with the cup assembly, but stand at an angle or slantwise. If reamed in that position the reamers 38 cut away part of the rind causing contamination of the juice.

The two spring biased pads or resilient contact means 36 and the knives 52 in the cups are provided to overcome this difficulty. After cutting, the halves are rotated to the second position and there the cup assembly is raised so that the fruit halves engage the resilient pads 36 to make their surfaces level with the cup assembly. During leveling the halves are forced onto knives 52. These knives are set at an angle to the horizontal and vertical planes such that slight rotation of the halves by the reamers tends to screw the halves tightly into position in the cups.

*Mechanism for Operating Reamers and Conical Floor*

Figure 6:
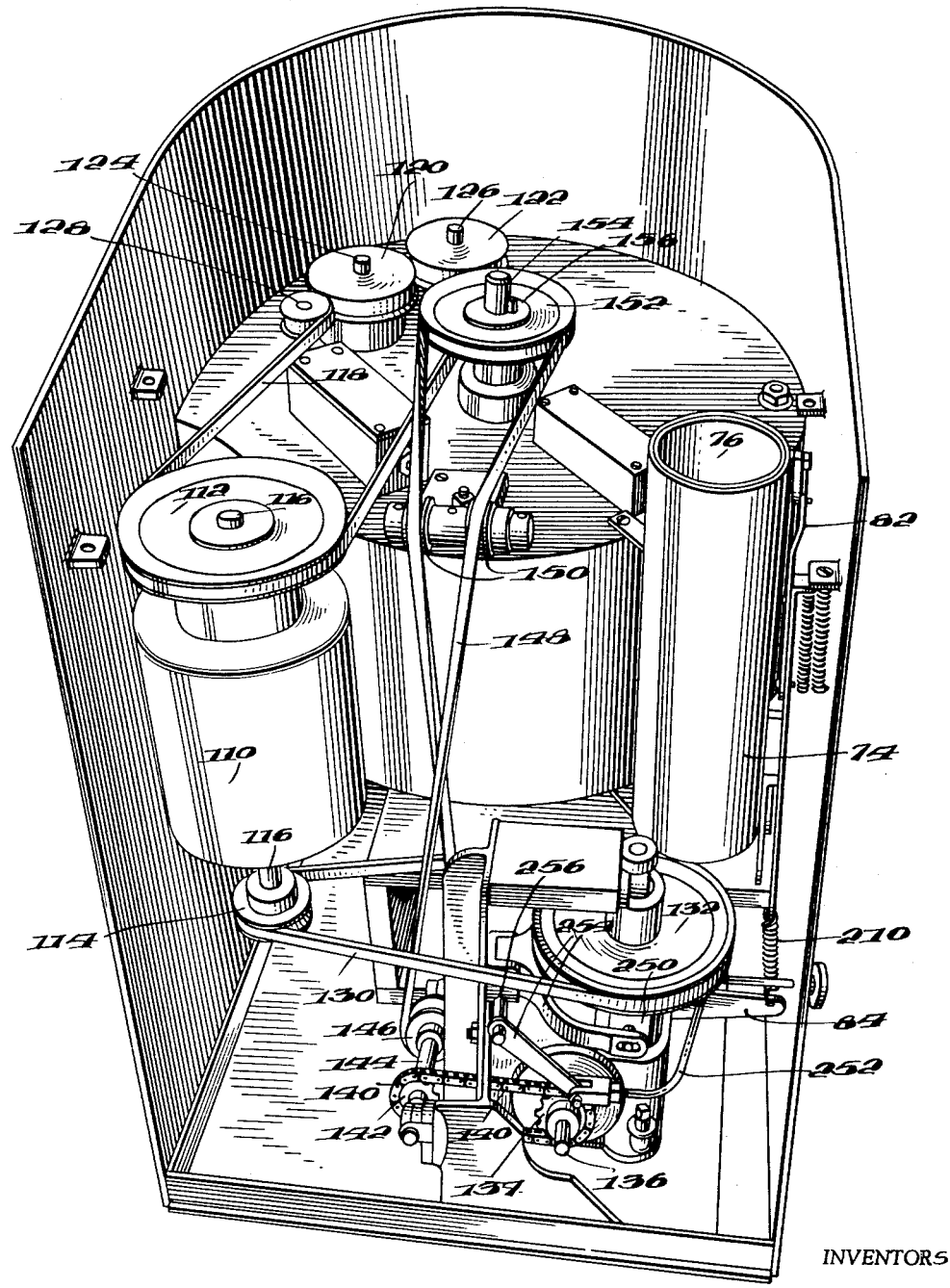
FIGURE 6 is a perspective view of the rear of the machine.
Figure 8:
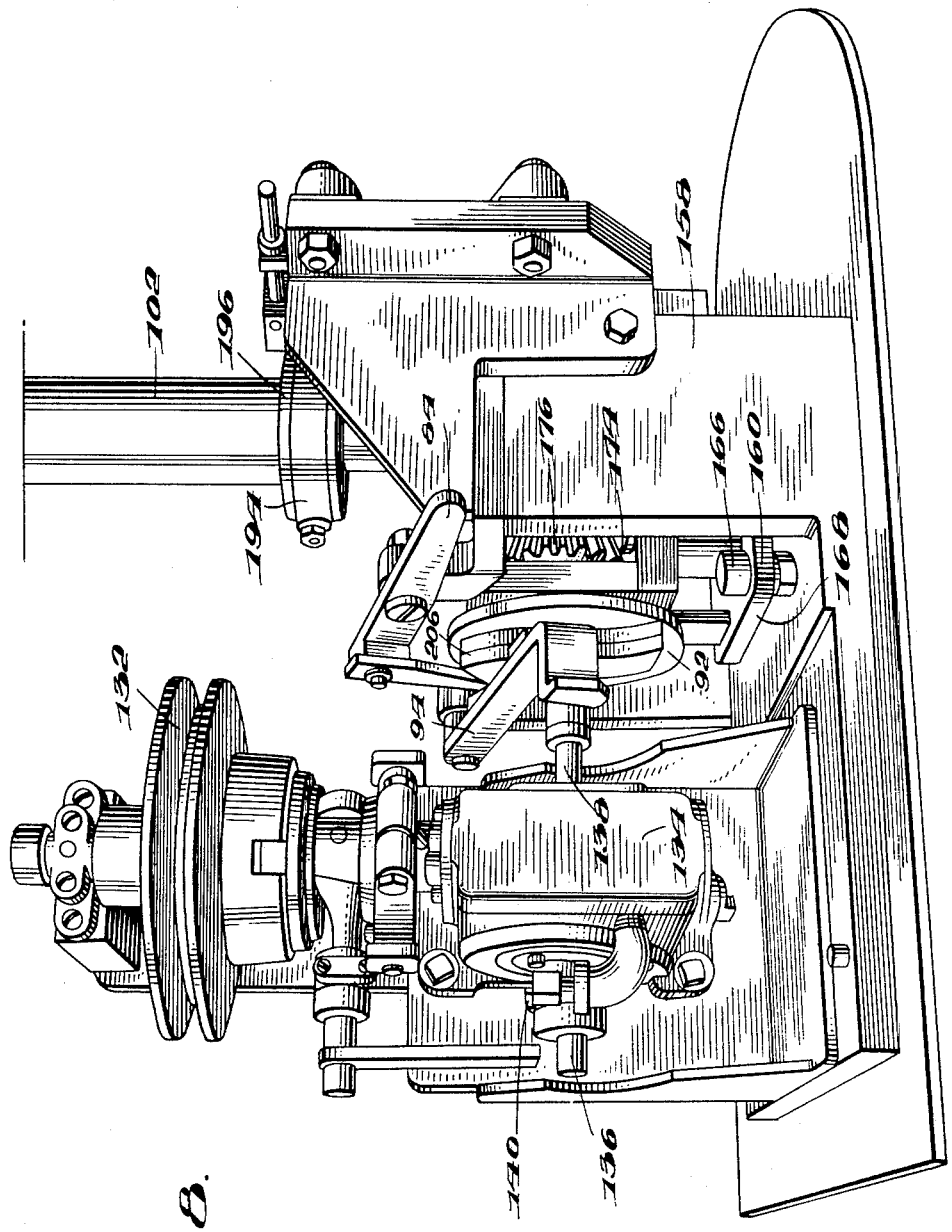
FIGURE 8 is a perspective view of the gear and cam mechanism taken from the rear thereof.

FIGS. 6 and 8 illustrate the mechanism utilized for the operation of the reamers and the rotation of the conical floor. In FIG. 6 is shown a motor 110 having an upper pulley 112 and a lower pulley 114 driven by the motor shaft 116. The upper pulley 112 is connected by a belt 118 to pulleys 120 and 122. The pulleys 120 and 122 are fixed to spindles 124 and 126, respectively, which are in turn fixed to the reamers 38. An idler pulley 128 provides the proper tensioning of the belt 118. Thus rotation of the upper pulley 112, caused by the operation of the motor, will drive the reamers 38 at high speed through the belt 118.

The lower pulley 114 is connected by a belt 130 to a larger main drive pulley 132. As shown in FIG. 8, the main drive pulley 132 is connected directly to a gear box 134, having output shafts 136 and 138. The output shaft 136 has fixed thereto a sprocket 137 which drives a chain 140. The chain 140 engages a sprocket 142 on a jack shaft 144, having splined thereto a small pulley 146. A belt 148, riding over a set of pulleys 150 rotatably mounted to the frame, drives a floor pulley 152. The floor pulley 152 is fixed to a spindle 154 which has a small key 156 adapted to engage a keyway in the conical floor when the conical floor is set in position on the shaft 154. Thus the belt 148 drives the pulley 152 and causes the slow rotation of the conical floor.

*Mechanism for Imparting Movement to Cup Assembly*

Figure 10:
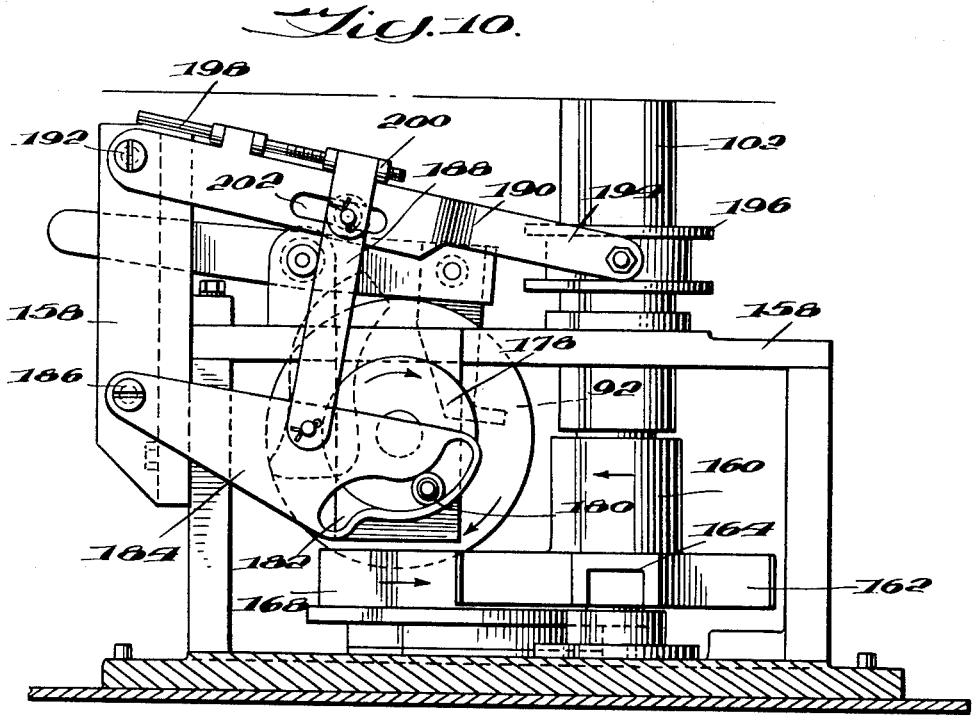
FIGURE 10 is a side elevational view of another part of the cam mechanism.

For the description of the mechanism for imparting rotary and up and down motion to the cup assembly 48, reference is made to FIGS. 8, 10 and 11.

Figure 7:
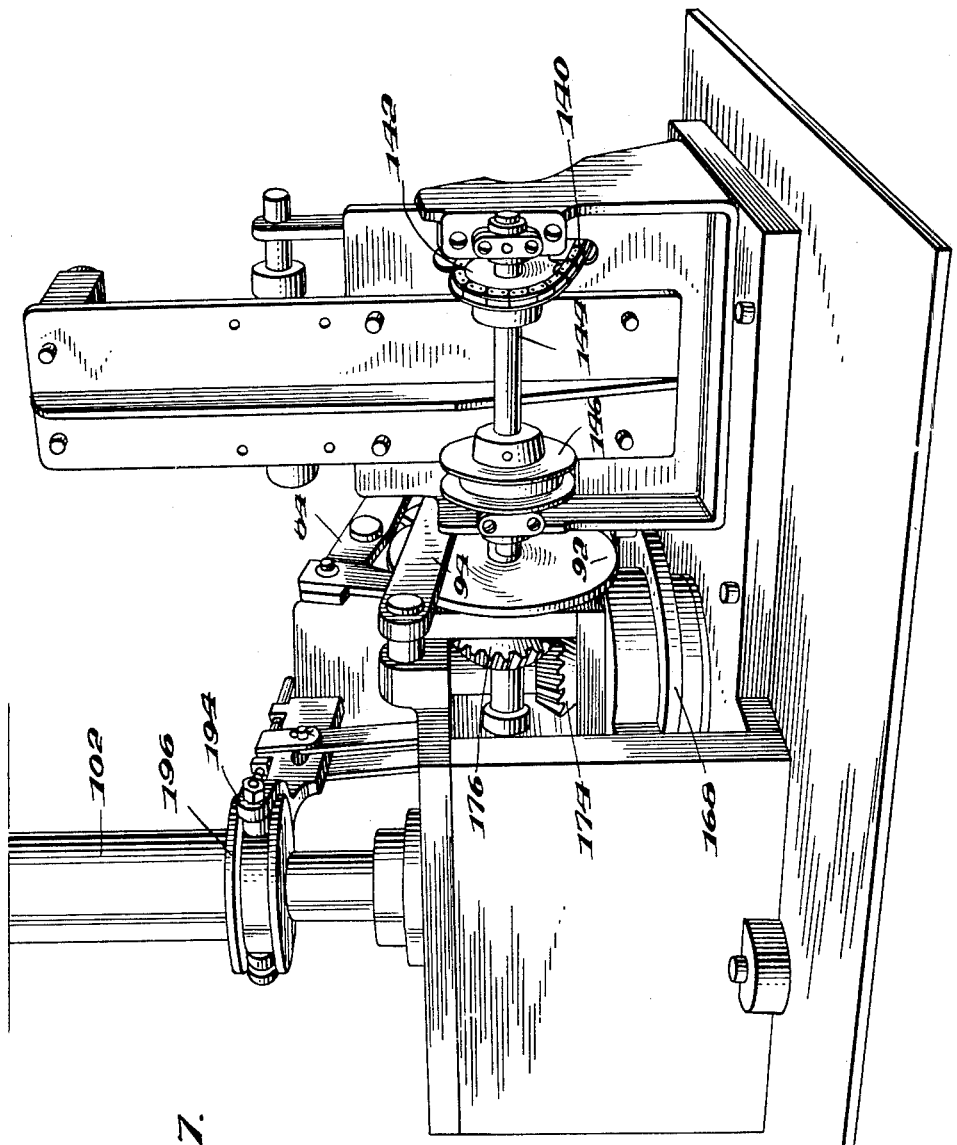
FIGURE 7 is a perspective view of the gear and cam mechanism taken from the front thereof.

The shaft 102 is journaled in a frame member 158 and is rotated by Geneva movement 160, which is splined to the shaft 102. The star wheel 162 of the Geneva movement has an X-shaped groove 164 in the bottom thereof which is engaged by a roller 166 rotatably mounted on the cam 168 of the Geneva movement. Cam 168 is fixed by a key 170 to a shaft 172, to which is fixed a bevel gear 174 (FIG. 7). Gear 174 is engaged by another bevel gear 176 which is fixed to shaft 138. The drive arrangement described above imparts to the cam 168 a continuous rotation. The cam 168 in turn imparts to the star wheel 162 an intermittent rotation of 90 degrees. The rotation of the star wheel is imparted to the cup assembly through the shaft 102.

Also fixed to the shaft 138 driven by wheel 132 is a back plate 178 which has a roller 180 rotatably mounted thereon. The roller 180 rides in an S-shaped groove 182, which is part of a cam follower 184 pivoted to the frame 158 at 186. Pivoted to the follower 184 is a link 188 connected to a toggle lever 190. The toggle lever 190 is pivoted at one end 192 thereof to the frame 158. The other end 194 of the toggle lever slidably engages a collar 196 fixed to the shaft 102.

It will be seen that clockwise rotation (FIG. 10) of the plate 178 will cause the toggle arm 190 to pivot up and down through the action of the roller 180 on cam 184 and link 188. The up and down motion imparted to the toggle lever will be transmitted to the shaft 102, which is permitted to move up and down by a spline connection between the shaft 102 and the star gear 160. It will also be observed that the particular shape of the cam slot 182 imparts a rapid upward motion until the top portion of the structure is reached, at which point the speed at which the mechanism is elevated is progressively diminished until the roller 180 reaches its topmost position. It has been found that by utilizing this progressively diminishing upward motion, which begins when the fruit first contacts the reamers, the reamers are permitted to extract maximum juice with minimum pressure and minimum use of power. It also prevents crushing or tearing of the pulp, rupturing of the rind oil cells and consequent contamination of the juice.

The amount of elevation of the shaft 102 can be varied by adjustment of the threaded rod 198 with respect to the nut 200. This adjustment varies the position of the link 188 with respect to the toggle lever 194. The slotted engagement 202 of the link 188 with the toggle lever 190 permits this change of relative position.

Mechanism for Operating Clamshell Dam and Fruit Pusher

As indicated diagrammatically in FIG. 3, the pusher 86 for initiating the fruit cutting action is operated by a link 96, which is driven by a cam 92 through a cam follower lever 94. The cam mechanism is shown in greater detail in FIG. 9. The cam 92 is keyed to the shaft 138 which operates the cup assembly lifting mechanism and is thereby driven in synchronism with the lifting mechanism. A roller 204 is rotatably mounted on the cam 92 and engages a follower 206 fixed to the follower lever 94. Rotation of the cam 92 thus causes the operation of the pusher through the roller 204, follower 206, lever 94 and link 96.

The fruit metering lever 84 is pivoted intermediate its ends at 208. One end is connected to a spring 210, which is connected to the link 82, best shown in FIG. 6. The end of the lever 84 remote from the spring 210 has fixed thereto a downwardly depending tab 212 normally lying in the path of the roller 204.

When the roller 204 engages the tab 212, the fruit metering lever 84 is pivoted clockwise, as viewed in FIG. 9, about point 208, thus causing the metering action of the clamshell dam 76 through the spring 210 and link 82.

Timing of Operations

Since the shaft 138 is rotated at the same speed as the cam 168, through a one to one gear ratio, it will be noted that for every lifting and rotary movement of the cup assembly, the operation of the clamshell dam and the fruit pusher occurs. It will also be observed that no rotary motion occurs during the lifting of the cup assembly, and the fruit pusher and metering operate in a timed sequence, so that the pusher receives a fruit when it is in its dotted line position; the pusher pushes the fruit onto the knife just before the lifting action of the cup assembly occurs; and the pusher is moved out of the way of the cup assembly during the lifting action.

The timing can be best understood by reference to FIGS. 9, 10 and 11. In the positions shown, the star wheel 162 and consequently the cup assembly 48 have just completed a rotation through an angle of 90 degrees. The clamshell dam 76 is closed; pusher 86 is in its dotted line position with a fruit in position to be thrust onto the knife; and the cup assembly is in its lowermost position.

Front plate cam 92 will rotate approximately 100 degrees, thereby operating the pusher 86 to force a fruit onto knife 34 and to return to dotted line position. Simultaneously the elevation of the cup assembly is begun through the rotation of back plate 178. In the next 90 degrees of rotation, the cup assembly is moved to its uppermost position, rapidly at first, then progressively slower when the fruit contacts reamers 38, as described above. During the first portion of this second phase, clamshell dam 76 is operated, metering one fruit into cylinder 74 onto the heel of pusher 86.

In the next 90 degrees, the cup assembly is lowered. During the first three phases, the cup assembly is locked against rotation by engagement of annular flange 169 with the star wheel.

In the last 90 degrees, the Geneva movement 160 imparts a rotation of ¼ turn to the cup assembly and operation is ready to begin again.

As shown in FIG. 6, a clutch 250, operated by a rod and handle 252 through a bell crank lever arrangement 254 pivoted at 256, is provided to disconnect the gears in gear box 134 from the main pulley 132. In this way, all of the operations except the rotation of the reamers 38 can be stopped without turning off the motor 110.

The capacity of the invention may be doubled, tripled, et cetera, by the provision of additional operating mechanisms but without departing from the scope of this invention. For example, using the same four-stop Geneva movement, the number of cups, knives, positioning pads and reamers at each station could be at least doubled, whereby the same basic steps of operation would process at least twice as many fruit. Alternatively, an eight-stop Geneva movement could be used with two complete but separate sets of operating mechanisms, each occupying one-half of the circumference of the machine. Each set of mechanisms would completely process a fruit in one-half of a revolution of the cup assembly. Thus, four times as much juice would be obtained in one revolution, while one revolution of the cup assembly would take twice as long as in the machine illustrated in the drawings.

While there has been described what is deemed to be practical and efficient embodiments of the invention, it should be well understood that the invention is not limited thereto, as there may be changes made in the arrangement, disposition and form of the parts without departing from the principle of the present invention, as comprehended within the scope of the accompanying claims.

We claim:

1. A fruit juicer comprising a frame, a cup assembly having a plurality of pairs of cups lying in a horizontal plane, said assembly being mounted on said frame, means connected to said assembly for rotating said assembly to move each set of cups through a plurality of processing stages including a positioning stage and a reaming stage, fruit processing means mounted on said frame above the plane of said assembly and including angularly spaced means for slicing, positioning and reaming said fruit, and means mounted on said frame for intermittently elevating said assembly, after rotating through each stage, for operative engagement of the fruit with said positioning means and said reaming means.

2. A fruit juicer according to claim 1 in which said last-named means includes means on said frame for elevating said assembly rapidly until the fruit contacts the reamer, then progressively slower until the reaming operation is completed.

3. A fruit juicing machine comprising a frame, a cup assembly rotatably mounted on said frame for rotation about a vertical axis, means connected to said assembly for rotating said assembly 360° in four intermittent steps of 90°, means connected to said assembly for elevating said assembly after each of said rotation steps, and halving means connected to said frame located in a first quadrant above said assembly, positioning and pressing means connected to said frame located in a second quadrant above said assembly and reaming means connected to said frame located in a third quadrant above said assembly.

4. A machine according to claim 3, further comprising ejecting means connected to said frame in a fourth quadrant and cooperating with said cup assembly for removal of reamed rinds.

5. A machine according to claim 3 in which said cup assembly comprises four pairs of cups spaced symmetrically about the axis of said assembly.

6. A machine according to claim 5 in which said halving means comprises a knife mounted on said frame above said assembly and lying in a vertical plane between the cups of a pair when said assembly is at rest, whereby cut halves of one fruit will fall into the cups of a pair.

7. In a fruit juicing machine, a knife, a device for pushing a fruit onto said knife, said knife comprising a sharp, substantially vertically extending edge, and means forming a slot in said knife extending from said edge away from said pushing device, said pushing device including means terminating the movement of said device toward said knife prior to passing said slot, whereby uncut fruit lodged in said slot will retain said fruit on said knife.

8. A machine according to claim 7 further comprising a cup assembly located below said knife and mounted for vertical movement, means for elevating and lowering said assembly, said assembly comprising at least one pair of cups separated by a slot, said slot being located immediately below said knife to receive said knife when said assembly is elevated, thereby completing the cutting operation.

9. In a fruit juice extractor, the combination of a fruit container, means for exhausting fruit from the container into an outlet in the container, means for metering the fruit in the outlet, at least two pairs of reaming cups on a circular table, means for imparting rotary motion about a vertical axis to said table, means for severing the fruit into halves causing the halves to fall apart and into one pair of the said reaming cups, reamers co-acting with the cups to remove the liquid, pulp, seeds and roughage from the halves, ejectors to remove the fruit peels from the cups, and means for actuating the first-mentioned means, said metering means, said table, said severing means, said reamers and said ejectors in a predetermined time order.

10. In a fruit juice extractor, the combination of a fruit container having a gravity outlet for the fruit, a rotatable floor in the container, a clamshell meter in the upper end of said outlet, at least two pairs of reaming cups on a table, means providing said table with alternating rotary and vertical motion, means for severing the fruit into halves, causing the same to fall apart and into one pair of reaming cups, said severing means including a stationary knife mounted above the reaming cup table, a movable arm to push the fruit into said knife, said table completing the fruit severing operation upon being moved vertically, high speed reamers to remove the liquid, pulp, seeds and roughage from the fruit halves, an arcuate, wedge-shaped ejector cooperating with said cups to remove the fruit peels from the reaming cups, and means for rotating the floor of the container, means for operating the clamshell meter, means for actuating the movable push-arm, means for rotating the reamers at high speed and the fruit skin ejector in a predetermined, timed order.

11. In a fruit juice extractor, the combination of a frame, a cylindrical container mounted in said frame, an outlet in the container for receiving the fruit, a cone-shaped rotatable floor in said container for impelling the fruit toward the outlet, means for rotating the floor, a metering device in the outlet, four pairs of reaming cups on a circular generally horizontal table mounted on said frame adjacent said outlet and below said container, means providing said table with alternately rotating motion about a vertical axis by means of a four-position Geneva indexing device and up and down motion by a cam actuated lever, a stationary severing blade located adjacent said outlet and above said table, a push arm in said outlet to receive the fruit and to impale the fruit on said blade, pads mounted on said frame above the reaming cups and engageable with fruit in said cups when said table is moved up, motor driven reamers mounted in said frame above said cups and angularly spaced from said pads for separating the liquid, pulp, seeds and roughage from the peels, a scoop for plowing the peels out of the reaming cups and over the rim of the juice-collecting bowl, said scoop traveling in grooves in the reaming cups and being operative by the rotary movement of the reaming cup table.

12. The invention described in claim 9 in which the reamers rotate at a speed sufficiently high as to cause the liquid and edible pulp to become a homogeneous mass.

13. In a fruit juicer according to claim 10, a pulp removal apparatus comprising: a foraminous strainer lying substantially in a horizontal plane, said reaming cups being mounted above said strainer, a wiper located between said strainer and said cups.

14. A fruit juicer comprising a frame, cup means mounted on said frame and having a pair of horizontal spaced cups, each cup having rind gripping means rigidly extending from its internal surface, knife means mounted on said frame for cutting a fruit, moving means operatively associated with said frame and operatively causing relative to and from movement of said cup means and said knife means, the knife means being positioned in a vertical plane between the cups when in proximity thereto to enable each discrete part of the cut fruit to fall into its respective cup, presser and leveler means having a resilient contact means for engaging the cut faces of the discrete parts, first means operatively associated with said frame and operatively causing relative to and from movement of said presser and leveler means and said cup means to enable the leveling engagement of said resilient contact means with said cut faces and the forcing of said rind gripping means into holding engagement with the outer surface rinds of the leveled discrete parts, reamer means, and second means operatively associated with said frame and operatively causing relative rotation and relative to and from movement of said reamer means and said cup means to enable the engagement of said reamer means with the cut face and internal body of each discrete part.

15. A fruit juicer as defined in claim 14 and including pusher means movably mounted on said frame for pushing a fruit onto said knife means and partially cutting the fruit, said knife means being rigidly mounted in a vertical plane on said frame and having a cutting edge with a slot therein, uncut fruit within said slot serving to retain the fruit on the knife means, said cup means having a passageway between said cups for enabling passage of said cutting edge therethrough and the completion of the cutting of the fruit into discrete parts.

References Cited in the file of this patent

UNITED STATES PATENTS

| | | |
|---|---|---|
| 1,686,017 | Lovet | Oct. 2, 1928 |
| 2,274,020 | Weightman et al. | Feb. 24, 1942 |
| 2,428,157 | Healy | Sept. 30, 1947 |
| 2,533,350 | Cahill | Dec. 12, 1950 |
| 2,576,470 | May | Nov. 27, 1951 |
| 2,630,849 | Williams | Mar. 10, 1953 |
| 2,677,402 | Watkins | May 4, 1954 |
| 2,682,900 | Whitehead | July 6, 1954 |
| 2,705,984 | Harden | Apr. 12, 1955 |
| 2,737,989 | Wurgaft | Mar. 13, 1956 |
| 2,799,313 | Schwarz | July 16, 1957 |